UNITED STATES PATENT OFFICE.

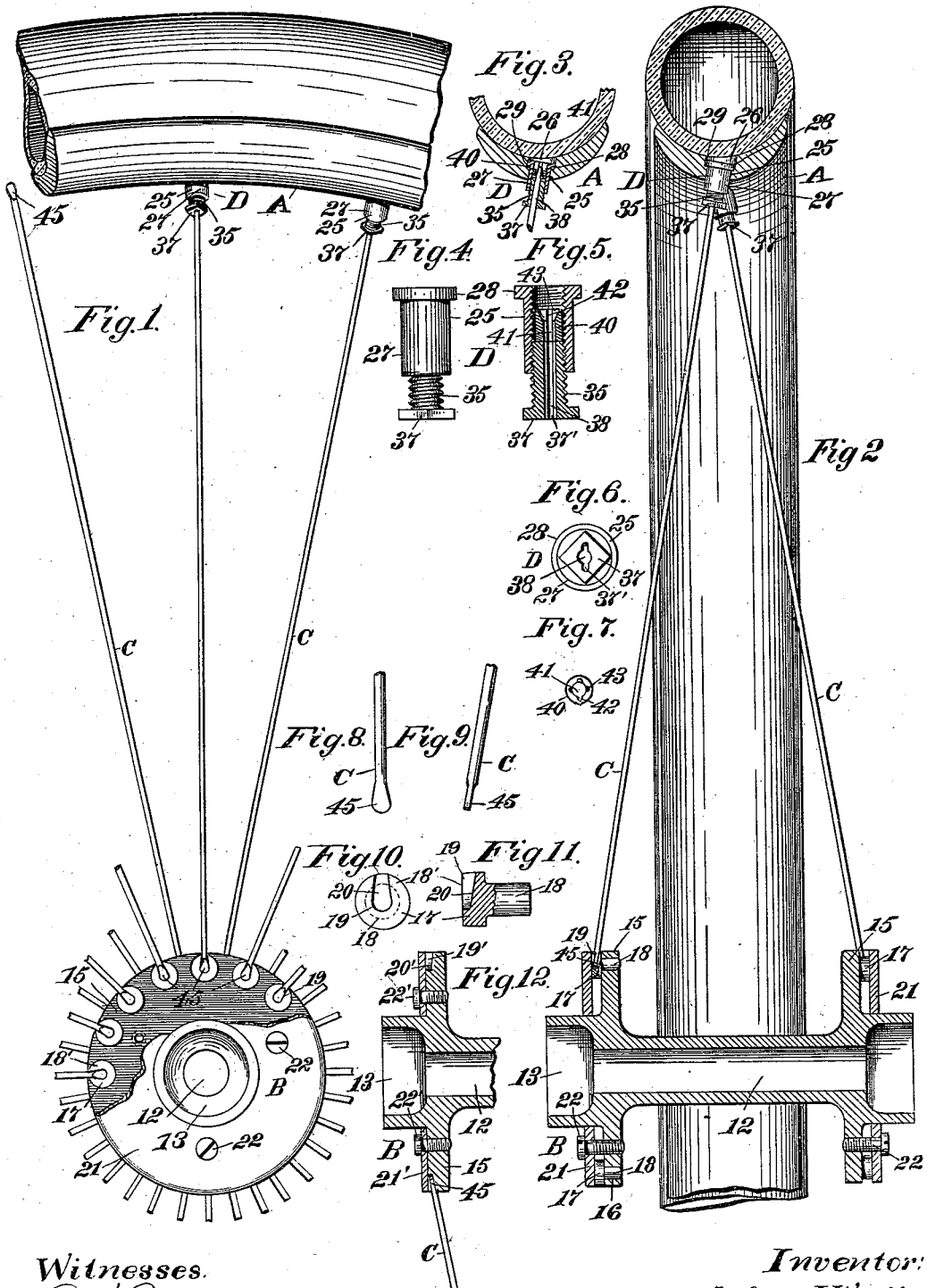

ARTHUR J. WOLFF, OF HARTFORD, CONNECTICUT.

VEHICLE-WHEEL.

SPECIFICATION forming part of Letters Patent No. 556,124, dated March 10, 1896.

Application filed November 29, 1895. Serial No. 570,358. (No model.)

*To all whom it may concern:*

Be it known that I, ARTHUR J. WOLFF, a citizen of the United States, residing at Hartford, in the county of Hartford and State of Connecticut, have invented certain new and useful Improvements in Vehicle-Wheels, of which the following is a specification.

My invention relates to vehicle-wheels, but more especially, however, to that class of wheels known in the art as "bicycle" and "tricycle" wheels, and more particularly relates to the attachment of the spokes thereof; and the object of my invention is to provide a wheel in which the spokes will be straight from end to end thereof and without flexure, and reversible and interchangeable with each other, and can be quickly and easily assembled and firmly held in position against displacement, and to also provide a wheel in which a defective spoke can be quickly and easily removed and replaced by a new spoke, and whereby also the tension of the spokes can be regulated relatively to each other for properly truing the wheel, and maintaining the same in condition for use.

In the drawings accompanying and forming part of this specification, Figure 1 is a side elevation of a portion of a wheel, showing the preferred form of means for attaching the spokes thereto. Fig. 2 is a diametrical, partly-sectional view, on an enlarged scale, of a portion of a wheel. Fig. 3 is a cross-sectional view of the felly or rim, a portion of the tire and the spoke securing and adjusting means in connection therewith. Fig. 4 is an elevation of the spoke securing and adjusting means detached. Fig. 5 is a vertical sectional view thereof. Fig. 6 is an under end view of the same. Fig. 7 is a top end view of one member of the spoke-adjusting means. Fig. 8 is a view of one end of a spoke. Fig. 9 is a view thereof, taken at right angles thereto. Fig. 10 is a left-hand end view of one form of means for securing the spokes in position relatively to the hub. Fig. 11 is a side view thereof, partly in section; and Fig. 12 is a sectional view of a portion of a hub and shows another form of means for securing the spokes in position relatively thereto.

Similar characters designate like parts in all the figures of the drawings.

My improved wheel, in the preferred form thereof herein shown and described, consists, in a general way, of a rim or felly, (designated generally by A,) a hub, (designated in a general way by B,) a series of spokes, (designated in a general way by C,) and suitable means (designated in a general way by D) for removably securing and adjusting the spokes relatively to the felly or rim and also for regulating the longitudinal tension thereof.

The hub B of the wheel may be of any suitable or well-known construction so far as concerns that portion which is supported on the axle of the shaft, and in the form shown the hub has the usual bearing portion 12 for receiving such axle and is provided at its ends with the usual cups or roller-bearing members 13. The hub B, however, in the preferred construction thereof herein shown and described has an annular spoke-flange 15 adjacent to each end thereof adapted to carry the inner ends of the spokes, and which spoke-flanges in the preferred construction of wheel are provided with a series of transverse openings or perforations 16, extending around the same. A block 17, having a stud or pin 18, is loosely mounted in each of these openings by means of its stud or pin, the inner wall of the block engaging the spoke-flange 15. Each of these blocks is provided on its face 18' with a tapering socket or recess (shown herein in the nature of a dovetailed socket or recess 19) having a wall 20, inclined toward the felly of the wheel, and into these sockets or recesses of the blocks 17 the inner ends of the spokes are secured. As one means for holding these spokes in position relatively to the block 17 and against longitudinal displacement and also for holding the blocks in position relatively to the flanges 15 suitable removable plates or disks 21 are carried by the hub and are secured to the same or to the spoke-flanges by any suitable means, such as screws or bolts 22, extending through said disks or plates 21 and into threaded apertures in the flanges 15. These plates may have their outer edges bent inward, if desired, or have projections formed on the inner walls adjacent to the outer edges thereof to more closely engage the ends of the spokes seated in the sockets or recesses 19. Instead, however, of securing the inner ends of the spokes to the spoke-flanges 15 by means of the blocks 17 the same may be secured in position relatively to the hub by having the outer faces of the flanges 15 provided with a series of tapering sockets or recesses extending around the same in the nature of dovetailed sockets or recesses 19', having inclined walls 20', and into which the inner ends of the spokes are adapted to be seated.

Plates or disks 21' similar to those above described are removably secured to the hub or spoke-flanges by any suitable means, such as screws or bolts 22', for holding the spokes against longitudinal displacement.

The means D for adjusting and securing the spokes in position relatively to the felly or rim of the wheel are shown in the nature of connectors, one for each spoke. Each of these connectors, in the preferred form thereof herein shown and described, consists of an interiorly threaded or headed nipple or sleeve 25, adapted to be seated in a recess or opening 26 in the felly or rim of the wheel, and which recess is shown of differential diameters. The sleeve portion 27 of this nipple projects through that part of the recess having the smallest diameter, and the head 28 thereof rests within that portion of the recess 26 having the largest diameter and rests on the juncture wall 29 of the recess. These recesses 26 are preferably inclined toward the spoke-flanges in alternation—that is to say, the inclination of one recess or opening 26 will be, for instance, toward the left-hand spoke-flange and preferably in the same plane of inclination as an inclined wall 20 of a socket or recess 19 of a block 17, while the inclination of the next recess of the series will be toward the right-hand spoke-flange, and, likewise, preferably in the same plane of inclination as an inclined wall 20 of a socket or recess 19 of a block 17—whereby the spokes will be straight from end to end thereof and without flexure. It will be understood, however, that it is not necessary that these inclined recesses or openings should be disposed in alternation, as they may be disposed in any desired way—such, for instance, as by having a series thereof inclined in one direction toward one spoke-flange and a series thereof inclined in the opposite direction toward the other spoke-flange.

It will also be understood that if it is desired to use curved or bent spokes the openings 26 may be formed in a plane at right angles to the axis of the wheel; but the preferable construction is to have these openings inclined, whereby the spokes may be straight and without flexure from end to end thereof.

An exteriorly-threaded tubular stem 35 engages the interior screw-threads of each of the sleeves or nipples 27 of the connectors and is adjustable therein by means of a suitable head 37. Extending from end to end of the threaded stem is a spoke-receiving opening or bore 38, preferably circular, and which also embodies a transverse slot 37' opening into the bore 38 to permit the insertion of the enlarged end of the spoke.

A sliding member 40, having a similar spoke-receiving bore 41, embodying a transverse slot 42, extending therethrough is movable within the sleeve 27 and is provided adjacent to its upper end with a tapering or dovetailed socket or recess 43, substantially at right angles to its slot 42, for locking the enlarged end of a spoke against displacement, as hereinafter set forth.

The spokes C, in the preferred form thereof herein shown and described, are straight and without flexure from end to end thereof and reversible and interchangeable, and are constructed with enlarged ends, (shown in the nature of dovetailed ends 45,) said ends being preferably flattened, as shown, to permit of their easy lateral insertion in and withdrawal from the recesses 19 in the faces of heads 17.

In assembling the spokes relatively to the felly and hub the outer end 45 of each spoke is passed through the bore 38 of a stem 35 and the bore 41 of a sliding member 40 until the dovetailed end 45 thereof is above the same. The spoke is then given a quarter-turn and drawn down to permit its dovetailed head 45 to engage the dovetailed socket or recess 43 of the sliding member, whereby the spoke is locked therein and held against displacement relatively to the felly of the wheel. Each spoke of the series has its inner end then seated in one of the sockets or recesses 19 of the blocks 17 and the plates or disks 21, secured in position, whereby the spokes will be held against displacement relatively to the hub.

By adjusting the threaded stems 35 within the threaded sleeves 27 the sliding members 40 can be adjusted to regulate the longitudinal tension of the spokes.

It will be understood that, if it is desired, the opposite ends of the spokes may have their dovetailed portions 45 at right angles to each other, it being simply necessary to have the sliding members 40 turned to permit their dovetailed sockets or recesses 43 to be at right angles to the sockets or recesses 19 of the blocks secured to the spoke-flanges.

By securing the spokes to the hub-flanges by means of the movable blocks the spokes can be swung, when free from the felly at the outer ends thereof, tangentially to the periphery of the hub-flanges, if desired, whereby they will cross each other at any suitable place determinate upon their tangential position.

By means of my improved construction of wheel, embodying reversible and interchangeable straight spokes, the same can be quickly and easily assembled, with the spokes tangentially disposed, if desired, and the longitudinal tension of the spokes regulated at all times to properly true the wheel, and whereby a defective spoke can be readily removed and replaced by a new spoke at any time.

Having described my invention, I claim—

1. A wheel comprising a flanged hub provided with a series of transverse openings or perforations; a movable block having a recessed face secured in each of said perforations; a felly; and removable spokes secured to the felly at one end and having their opposite ends inserted in the recessed faces of said blocks.

2. A wheel comprising a flanged hub having a series of transverse perforations; a series of movable blocks each provided with a head having a dovetailed recess in its face; a felly; and a series of spokes secured at one end to the felly and having their opposite ends shaped to fit said dovetailed recesses.

3. A wheel consisting of a felly; a hub having a spoke-flange having transverse openings or perforations therein; a movable block secured in each of said openings or perforations, and having a socket or recess therein; removable spokes having their outer ends secured to the felly, and their inner ends seated in said sockets or recesses of the blocks; and means carried by the hub for holding said spokes in said sockets.

4. A wheel consisting of a felly; a hub having a spoke-flange having transverse openings or perforations therein; a movable block secured in each of said openings or perforations, and having a socket or recess therein; spokes having their outer ends secured to the felly, and their inner ends seated in said sockets or recesses of the blocks; and a disk or plate in position on said hub for securing said spokes in said sockets and the blocks in position relatively to the spoke-flange.

5. A wheel consisting of a felly; a hub having a spoke-flange having transverse openings or perforations therein; a block secured in each of said openings, and having a dovetailed socket or recess having an inclined wall; and removable and interchangeable spokes having dovetailed heads seated in said sockets or recesses, and having their outer ends secured to the felly.

6. A wheel consisting of a felly; a hub having a spoke-flange having a series of transverse openings or perforations therein; a movable block having a stud or pin seated in each of said openings, and having a dovetailed socket or recess therein, said socket or recess having an inclined wall; a series of spokes having dovetailed ends seated in said dovetailed sockets of the blocks, and having their outer ends secured to the felly; and a disk or plate for holding said spokes in position relatively to the blocks, and for holding said blocks in position relatively to the spoke-flange.

7. A connector for spokes, consisting of an interiorly-threaded sleeve or nipple; an exteriorly-threaded stem adapted to engage the threaded sleeve, and having a spoke-receiving opening extending from end to end thereof; and an independent sliding member adjustable in said sleeve or nipple, and also having a spoke-receiving opening, and having a socket or recess for locking said spoke in position within the sleeve.

8. A connector for spokes, consisting of a sleeve or nipple, a stem adjustable therein, and having a spoke-receiving opening extending from end to end thereof; and independent means movable in said sleeve for receiving and securing the end of a spoke within said sleeve.

9. A connector for spokes, consisting of an interiorly-threaded sleeve or nipple; an exteriorly-threaded stem adapted to engage the threaded sleeve, and having a spoke-receiving bore embodying a slot opening thereinto, and extending from end to end of said stem; and a sliding member adjustable in said sleeve or nipple, and also having a spoke-receiving bore embodying a slot opening thereinto, and extending from end to end of said member; and said member having a tapering socket or recess adjacent to the upper end of said member, and substantially at right angles to the slot thereof, for locking a spoke in position within the sleeve.

10. A connector for spokes, consisting of a sleeve or nipple; a stem adjustable therein, and having a spoke-receiving opening extending from end to end thereof; a sliding member movable in said sleeve, and also having a spoke-receiving opening extending from end to end thereof; and said member having a socket or recess adjacent to its upper end, and substantially at right angles to the spoke-receiving opening, for locking a spoke within said sleeve.

11. A wheel consisting of a felly having a series of recesses therein; a connector seated in each of said recesses, and comprising an interiorly-threaded sleeve and an exteriorly-threaded stem fitting into said threaded sleeve, and having an opening extending therethrough; and a sliding member adjustable in said sleeve, and also having an opening extending therethrough; said member having a socket or recess for locking a spoke in position within said sleeve; a hub having a spoke-flange having transverse openings or perforations; a movable block seated in each of said perforations; and spokes having their inner ends secured within the sleeves of the connectors and their outer ends to said blocks.

12. A wheel consisting of a felly having oppositely-inclined recesses disposed in alternation; a connector seated in each of said recesses, and comprising an interiorly-threaded sleeve; an exteriorly-threaded stem having a spoke-receiving opening extending therethrough; a movable independent member also having a spoke-receiving opening extending therethrough, and having a socket or recess, substantially at right angles to the spoke-receiving opening, for locking a spoke in position therein; a hub having spoke-flanges having a series of transverse openings or perforations therein; and a movable block secured in each of said openings, and having a socket or recess; and spokes having enlarged heads, and having their outer ends secured to the connectors, and their inner ends fitting within the sockets of the blocks.

13. A wheel consisting of a felly having oppositely-inclined recesses disposed in alternation; a connector seated in each of said recesses, and comprising an interiorly-threaded sleeve; an exteriorly-threaded stem having a spoke-receiving opening extending therethrough; a movable independent member, also having a spoke-receiving opening extending therethrough, and having a tapering socket or recess, substantially at right angles to the spoke-receiving opening, for locking a spoke in position therein; a hub having spoke-flanges having a series of transverse openings or perforations; a movable block secured in each of said perforations, and having a tapering socket or recess having its inner wall in the same plane of inclination as one of the inclined recesses of the felly; two sets of reversible and interchangeable straight spokes having enlarged tapering dovetailed ends, and having the inner ends fitting into the sockets or recesses of the blocks, and having the outer ends thereof secured within the connectors of the felly; and means for holding the inner ends of said spokes in position relatively to the blocks, and for holding said blocks in position relatively to the flanges.

ARTHUR J. WOLFF.

Witnesses:
FRED. J. DOLE,
C. S. WEED.